US011150585B2

(12) United States Patent
Yoshimura

(10) Patent No.: US 11,150,585 B2
(45) Date of Patent: Oct. 19, 2021

(54) IMAGE FORMING APPARATUS, DOCUMENT READING DEVICE AND CONVEYANCE METHOD

(71) Applicants: KABUSHIKI KAISHA TOSHIBA, Tokyo (JP); TOSHIBA TEC KABUSHIKI KAISHA, Tokyo (JP)

(72) Inventor: Yoshio Yoshimura, Numazu Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 84 days.

(21) Appl. No.: 16/797,974

(22) Filed: Feb. 21, 2020

(65) Prior Publication Data

US 2020/0192266 A1 Jun. 18, 2020

Related U.S. Application Data

(63) Continuation of application No. 15/919,633, filed on Mar. 13, 2018, now Pat. No. 10,571,846.

(51) Int. Cl.
*G03G 15/00* (2006.01)
*B65H 1/14* (2006.01)
(Continued)

(52) U.S. Cl.
CPC ............. *G03G 15/602* (2013.01); *B65H 1/00* (2013.01); *G03G 15/5025* (2013.01);
(Continued)

(58) Field of Classification Search
CPC .. G03G 15/00; G03G 15/5025; G03G 15/602; G03G 15/605; G03G 15/607;
(Continued)

(56) References Cited

U.S. PATENT DOCUMENTS

| 6,091,927 A | 7/2000 | Hattori et al. |
| 6,988,723 B2 | 1/2006 | Kitami et al. |

(Continued)

FOREIGN PATENT DOCUMENTS

| JP | 2000-053255 A | 2/2000 |
| JP | 2005-112558 A | 4/2005 |

OTHER PUBLICATIONS

Notice of Allowance on U.S. Appl. No. 15/919,633 dated Oct. 23, 2019.

*Primary Examiner* — Nguyen Q. Ha
(74) *Attorney, Agent, or Firm* — Foley & Lardner LLP

(57) ABSTRACT

An image forming apparatus comprises a tray, a conveyor, a detector and a movement mechanism. The tray accommodates at least one document. The conveyor conveys the document placed on the tray. The detector detects that the document is placed on the tray. The movement mechanism moves the tray from a first position to a second position closer to the conveyor than the first position based on the detection that the document is placed on the tray, and after moving the tray from the first position to the second position, moves the tray to the first position based on a setting of a mixed stacking mode in which mixing of the documents with different sizes on the tray is permitted.

20 Claims, 4 Drawing Sheets

(51) Int. Cl.
*B65H 1/24* (2006.01)
*H04N 1/00* (2006.01)
*B65H 1/00* (2006.01)

(52) U.S. Cl.
CPC ......... *G03G 15/605* (2013.01); *G03G 15/607* (2013.01); *G03G 15/6502* (2013.01); *H04N 1/00* (2013.01)

(58) Field of Classification Search
CPC ........ G03G 15/6502; B65H 1/00; B65H 1/14; B65H 1/24; H04N 1/00
See application file for complete search history.

(56) References Cited

U.S. PATENT DOCUMENTS

| | | |
|---|---|---|
| 7,364,155 B2 | 4/2008 | Nagao et al. |
| 10,571,846 B2 * | 2/2020 | Yoshimura ......... H04N 1/00793 |
| 2003/0085506 A1 | 5/2003 | Kubo |
| 2004/0156662 A1 | 8/2004 | Fujii et al. |
| 2005/0002710 A1 | 1/2005 | Ishikura et al. |
| 2010/0148420 A1 | 6/2010 | Hamano et al. |
| 2018/0097953 A1 * | 4/2018 | Uchiyama .......... H04N 1/00649 |

* cited by examiner

IMAGE FORMING APPARATUS, DOCUMENT READING DEVICE AND CONVEYANCE METHOD

CROSS-REFERENCE TO RELATED APPLICATIONS

This application is a continuation of U.S. patent application Ser. No. 15/919,633 filed Mar. 13, 2018, the entire contents of which are incorporated herein by reference, and which was granted as U.S. Pat. No. 10,571,846 on Feb. 25, 2020.

FIELD

Embodiments described herein relate generally to an image forming apparatus, a document reading device and a conveyance method.

BACKGROUND

ADF (Auto Document Feeder) devices permitting mixing of documents with different sizes are widespread. Furthermore, ADF devices loaded with a document tray vertically movable are widespread as well. This is because the number of documents that can be placed on document tray is increasing.

Such ADF devices enable the document tray to move to a position of a document feed roller after a predetermined time has elapsed since a document on the document tray is detected, thereby reducing a waiting time of a user.

However, it is difficult for the user to correctly set the documents with different sizes on the document tray within the above-mentioned predetermined time. Furthermore, even if the user places the documents with different sizes on the document tray at once while aligning them, there is a possibility that the documents shift on the document tray and become skewed.

DETAILED DESCRIPTION

According to at least one embodiment, an image forming apparatus comprises a tray, a conveyance section, a detection section and a movement mechanism. The tray accommodates at least one document. The conveyance section conveys the document placed on the tray. The detection section detects that the document is placed on the tray. The movement mechanism moves the tray from a first position to a second position closer to the conveyance section than the first position based on the detection that the document is placed on the tray, and after moving the tray from the first position to the second position, moves the tray to the first position based on a setting of a mixed stacking mode in which mixing of the documents with different sizes on the tray is permitted.

Hereinafter, at least one embodiment is described with reference to the accompanying drawings.

The configuration of an image forming apparatus according to at least one embodiment is described.

Figure 1:
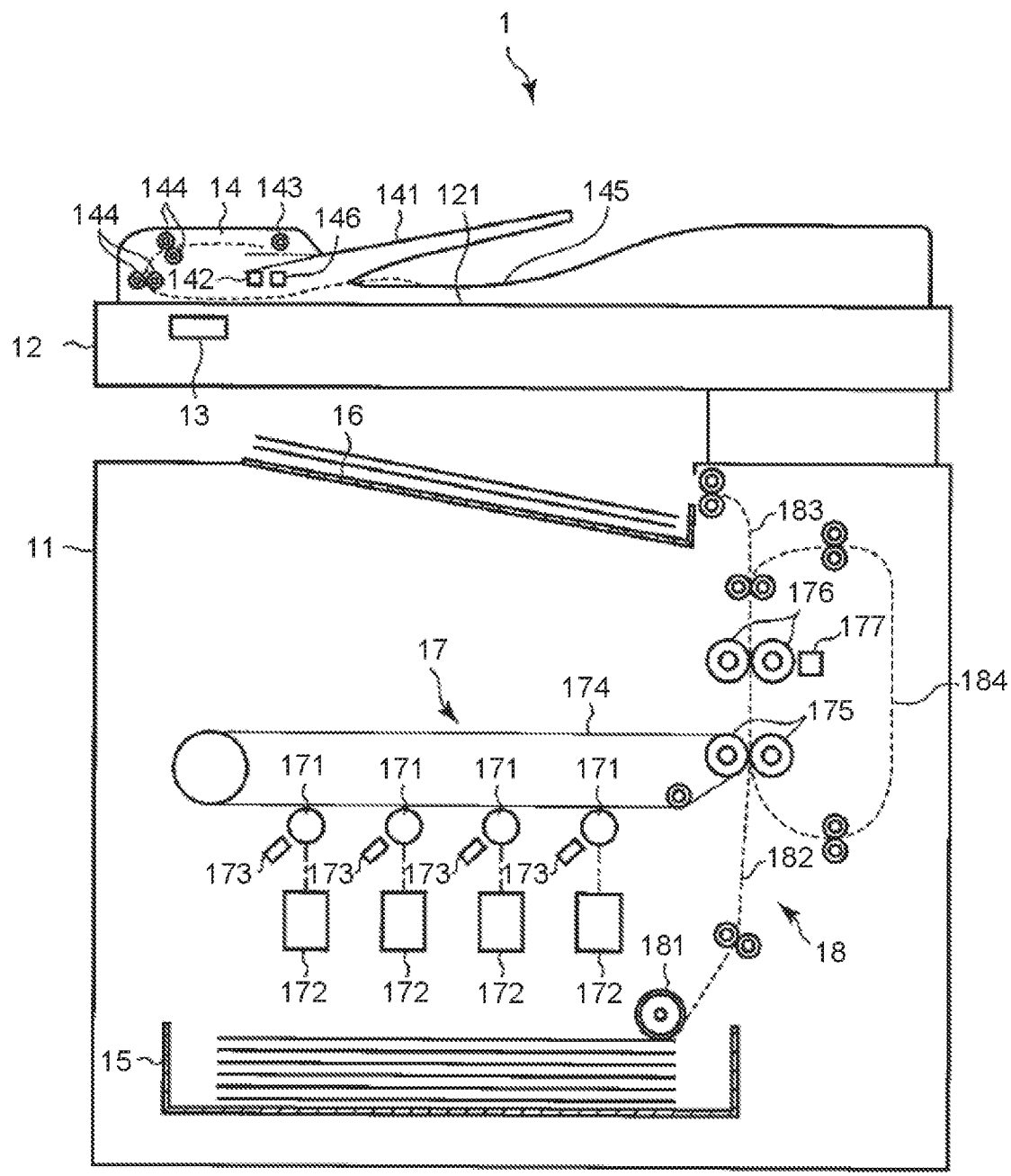
FIG. 1 is a schematic diagram exemplifying an image forming apparatus according to at least one embodiment.

FIG. 1 is a schematic diagram exemplifying an image forming apparatus 1. The image forming apparatus 1 executes various processes such as image formation while conveying an image receiving medium. The image forming apparatus 1 is, for example, a MFP (Multi-Function Peripheral).

The image forming apparatus 1 comprises a housing 11, a document table 12, a scanner section 13, an ADF device 14, a sheet feed cassette 15, a sheet discharge tray 16, an image forming section (image former) 17 and a conveyance section (conveyor) 18.

The housing 11 is a main body for holding the document table 12, the scanner section 13, the ADF device 14, the sheet feed cassette 15, the sheet discharge tray 16, the image forming section 17 and the conveyance section 18.

The document is placed on the document table 12. The document table 12 includes a glass plate 121. The document is placed on the glass plate 121.

The scanner section 13 acquires image data from the document. The scanner section 13 is arranged inside the document table 12. The scanner section 13 includes an image sensor, an optical element, a lighting device, and the like, which are not shown.

The image sensor is an image capturing element in which pixels for converting light to an electrical signal (image signal) are arranged linearly. The image sensor is made up by, for example, a CCD (Charge Coupled Device), CMOS (Complementary Metal Oxide Semiconductor), or another image capturing element.

The optical element causes light from a predetermined reading range to be imaged on pixels of the image sensor. The reading range of the optical element is a line-shaped region on the glass plate 121. The optical element images light reflected by the document placed on the glass plate 121 and transmitting through the glass plate 121 on the pixels of the image sensor.

The lighting device illuminates the document on the glass plate 121 with the light. The lighting device includes a light source and a light guide for illuminating the document with the light from the light source. The lighting device illuminates an area containing the reading range of the optical element by the light guide with the light emitted from the light source.

The scanner section 13 is driven by a driving mechanism (not shown) in a sub-scanning direction orthogonal to the arrangement direction (main scanning direction) of the pixels of the image sensor. The scanner section 13 is driven in the sub-scanning direction and acquires image data of the entire document placed on the glass plate 121 by acquiring an image of each line successively by the image sensor.

The ADF device 14 continuously conveys the documents one by one to a position opposite to the position of the scanner section 13 on the glass plate 121. The ADF device 14 is provided on the document table 12 in an openable manner. The ADF device 14 is an example of a document reading device.

The ADF device 14 includes a document tray 141, a sensor 142, a document feed roller 143, a plurality of conveyance rollers 144, a document discharge tray 145 and a movement mechanism 146.

The document tray 141 is used for placing the document to be picked up to the ADF device 14. The document tray 141 accommodates the document. The document tray 141 is movable between a first position and a second position. The first position is a home position. The document tray 141 at the first position is indicated by a solid line in FIG. 1. The second position is a position where the document feed roller 143 described later can pick up the documents placed on the document tray 141 one by one to the ADF device 14. Therefore, the second position is closer to the document feed roller 143 than the first position. The second position is, for example, above the first position. The document tray 141 at the second position is indicated by a chain line in FIG. 1.

In the document tray 141, a part including a position facing the document feed roller 143 in the document tray 141 is movable. Alternatively, the document tray 141 may be configured such that the entire document tray 141 is movable.

The sensor 142 is a detector that detects that the document is placed at a predetermined position of the document tray 141. The sensor 142 outputs information indicating the detection of the document based on the detection that the document is placed on the document tray 141. The sensor 142 is, for example, an optical sensor, but is not limited thereto.

The document feed roller 143 rotates by an operation of a motor (not shown) and conveys the document placed on the document tray 141. As a result, the document feed roller 143 picks up the documents one by one to the ADF device 14. The document feed roller 143 is located, for example, above the document tray 141. If the document tray 141 is at the first position, the document feed roller 143 does not contact with the document placed on the document tray 141. On the other hand, if the document tray 141 is at the second position, the document feed roller 143 contacts with the document placed on the document tray 141. The document feed roller 143 is an example of a conveyance section (a conveyor).

The plurality of conveyance rollers 144 conveys the documents one by one to a position opposite to the position of the scanner section 13 on the surface of the glass plate 121 and discharges them to the document discharge tray 145. As a result, the scanner section 13 can acquire the image data of the entire document by continuously acquiring an image of each line from the document conveyed by the ADF device 14.

The document discharge tray 145 is a table to which the document conveyed by the plurality of conveyance rollers 144 in the ADF device 14 is discharged.

The movement mechanism 146 moves the document tray 141 between the first position and the second position. The movement mechanism 146 is composed of at least one motor, for example.

The sheet feed cassette 15 accommodates a printing medium. The sheet feed cassette 15 is capable of supplying the printing medium from the outside of the housing 11. The sheet feed cassette 15 is capable of being drawn out from the housing 11.

The sheet discharge tray 16 supports the printing medium discharged from the image forming apparatus 1.

The image forming section 17 forms an image on the printing medium. The image forming section 17 includes a drum 171, an exposure device 172, a developing device 173, a transfer belt 174, a pair of transfer rollers 175, a pair of fixing rollers 176 and a thermal fixing load 177. The drum 171, the exposure device 172 and the developing device 173 are provided for each different color such as cyan, magenta, yellow and black, for example.

The drum 171 is a photoconductive drum formed into a cylindrical shape. The drum 171 is provided in contact with the transfer belt 174. The surface of the drum 171 is uniformly charged by an electrostatic charger (not shown). The drum 171 is rotated at a constant speed by a driving mechanism (not shown).

The exposure device 172 emits light having a wavelength capable of forming a latent image on the charged drum 171 in response to an electric signal (image signal) of print data. Thereby, the exposure device 172 forms an electrostatic latent image on the charged drum 171.

The developing device 173 attaches toner (developer) to the electrostatic latent image formed on the drum 171. As a result, the developing device 173 forms an image of toner (toner image) on the surface of the drum 171.

The transfer belt 174 receives the toner image formed on the surface of the drum 171 and transfers it onto the printing medium. The transfer belt 174 moves by rotation of a roller (not shown). The transfer belt 174 receives the toner image formed on the drum 171 at a position in contact with the drum 171 and conveys the received toner image to the pair of transfer rollers 175.

The pair of transfer rollers 175 sandwiches the transfer belt 174 and the printing medium. The pair of transfer rollers 175 transfers the toner image on the transfer belt 174 onto the printing medium.

The pair of fixing rollers 176 sandwiches the printing medium. The pair of fixing rollers 176 is heated by the thermal fixing load 177 described later. The pair of fixing rollers 176 fixes the toner image formed on the printing medium by applying pressure to the sandwiched printing medium in a heated state. As a result, the pair of fixing rollers 176 forms an image on the printing medium by fixing the toner image on the printing medium.

The thermal fixing load 177 is a heater (heating element) that heats the pair of fixing rollers 176. The thermal fixing load 177 is provided in the vicinity of the pair of fixing rollers 176. The thermal fixing load 177 is made of, for example, a metal that generates heat by electromagnetic waves.

The conveyance section 18 conveys the printing medium within the image forming apparatus 1. The conveyance section 18 includes a pickup roller 181, a sheet feed conveyance path 182, a sheet discharge conveyance path 183, and an inversion conveyance path 184.

The pickup roller 181 picks up the printing medium accommodated in the sheet feed cassette 15 to the sheet feed conveyance path 182 described later. The pickup roller 181 rotates according to the operation of a motor.

The sheet feed conveyance path 182 is used for conveying the printing medium picked up from the sheet feed cassette 15 by the pickup roller 181 to the image forming section 17. The sheet feed conveyance path 182 is composed of a plurality of guides and a plurality of rollers. The plurality of rollers forming the sheet feed conveyance path 182 rotates by the operation of the motor.

The sheet discharge conveyance path 183 is used for discharging the printing medium on which an image is formed by the image forming section 17 from the housing 11. The printing medium is discharged to the sheet discharge tray 16 through the sheet discharge conveyance path 183. The sheet discharge conveyance path 183 is composed of a plurality of guides and a plurality of rollers. The plurality of rollers forming the sheet discharge conveyance path 183 rotates by the operation of a motor.

The inversion conveyance path 184 is used to supply the printing medium again to the image forming section 17 in a state in which the front and rear sides and the front and back surfaces of the printing medium on which the image is formed by the image forming section 17 are inverted. The inversion conveyance path 184 is composed of a plurality of guides and a plurality of rollers. The plurality of rollers making up the inversion conveyance path 184 rotates by the operation of a motor.

Figure 2:
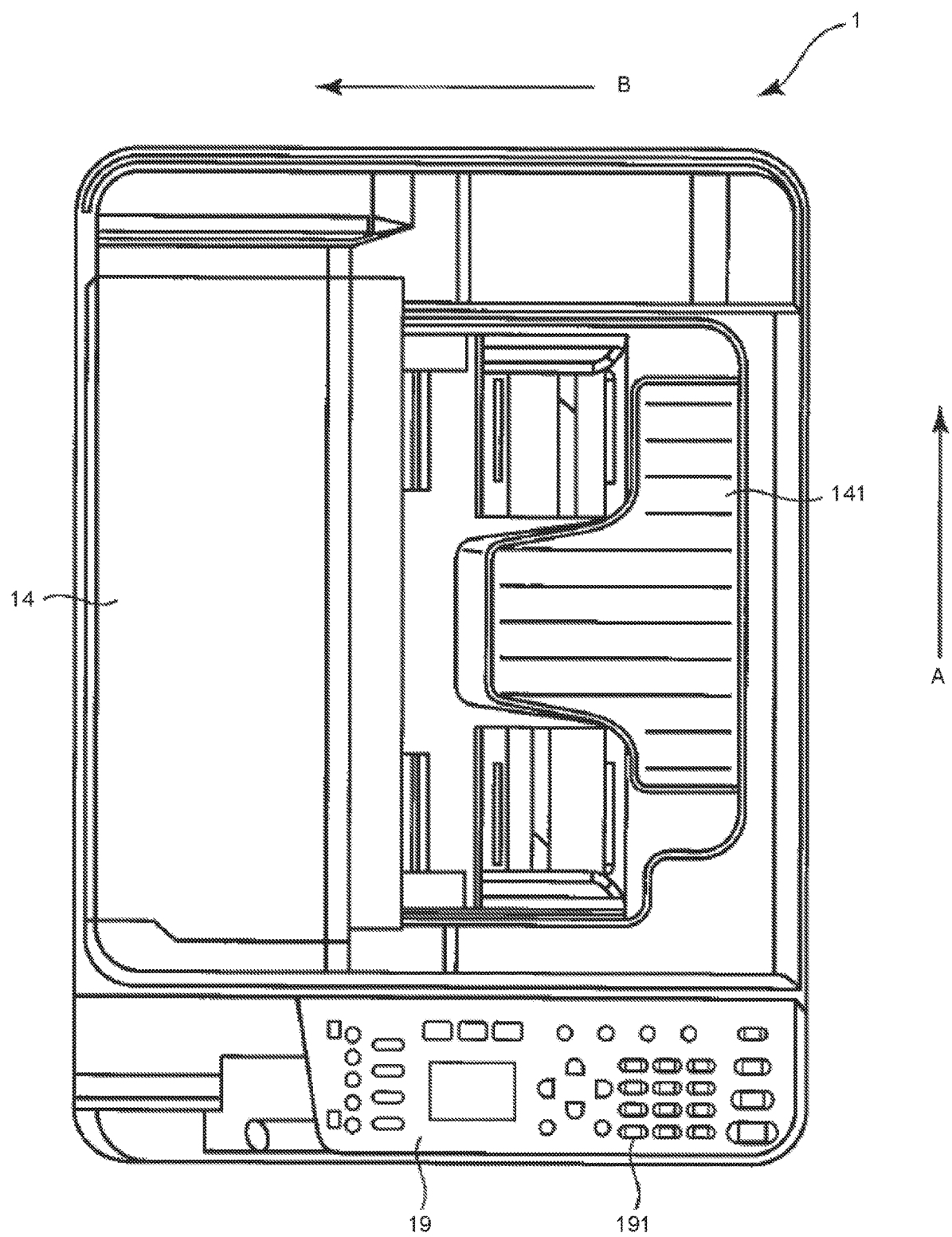
FIG. 2 is a top view exemplifying the image forming apparatus according to at least one embodiment.

FIG. 2 is a top view exemplifying the image forming apparatus 1. The image forming apparatus 1 further includes a control panel 19. The control panel 19 is an input device for receiving an operation by a user. The control panel 19 outputs information indicating the operation by the user based on the operation by the user.

The control panel 19 includes a plurality of buttons 191. The plurality of buttons 191 is configured in such a manner that the user can press them. The plurality of buttons 191 includes a "document reading start" button and a "mixed stacking mode" button.

The "document reading start" button is described. The "document reading start" button is used for inputting the start of reading the document placed on the document tray 141. By pressing the "document reading start" button, the ADF device 14 conveys the document placed on the document tray 141 with the document feed roller 143 and starts picking up the documents one by one.

A "mixed stacking mode" button is described. The "mixed stacking mode" button is used for setting a mode in which mixing of the documents with different sizes on the document tray 141 is permitted. The mixed stacking mode includes a first mixed stacking mode and a second mixed stacking mode described below. By pressing the "mixed stacking mode" button, the image forming apparatus 1 is set so as to permit either one of the first mixed stacking mode and the second mixed stacking mode.

The first mixed stacking mode is a mode in which the mixing of documents with different sizes in a first direction A of the document tray 141 is permitted. As shown in FIG. 2, the first direction A is orthogonal to a conveyance direction of the document placed on the document tray 141. For the first mixed stacking mode, a case in which a document of A4 size and a document of A3 size are placed on the document tray 141 is provided as an example. The document of A4 size and the document of A3 size are placed at predetermined positions of the document tray 141 with one end of each document aligned. The document of A4 size is placed on the document tray 141 in such a manner that short sides are arranged along the first direction A and long sides are arranged along a second direction B. The second direction B corresponds to the conveyance direction of the document placed on the document tray 141, as shown in FIG. 2. The document of A3 size is placed on the document tray 141 in such a manner that short sides are arranged along the first direction A and long sides are arranged along the second direction B. In this manner, the document of A4 size and the document of A3 size placed on the document tray 141 are different in the size in the first direction A of the document tray 141.

The second mixed stacking mode is a mode in which the mixing of the documents with different sizes in the second direction B of the document tray 141 is permitted. For the second mixed stacking mode, a case in which the document of A4 size and the document of A3 size are placed on the document tray 141 is provided as an example. The document of A4 size and the document of A3 size are placed at predetermined positions of the document tray 141 with one end of each document aligned. The document of A4 size is placed on the document tray 141 in such a manner that the long sides are arranged along the first direction A and the short sides are arranged along the second direction B. The document of A3 size is placed on the document tray 141 in such a manner that the short sides are arranged along the first direction A and the long sides are arranged along the second direction B. In this manner, the document of A4 size and the document of A3 size placed on the document tray 141 are different in the size in the second direction B of the document tray 141.

The input operation of the document reading start and a setting operation of the mixed stacking mode may be realized by an operation on a touch panel by the user instead of the operation of the plurality of buttons 191 described above.

Figure 3:
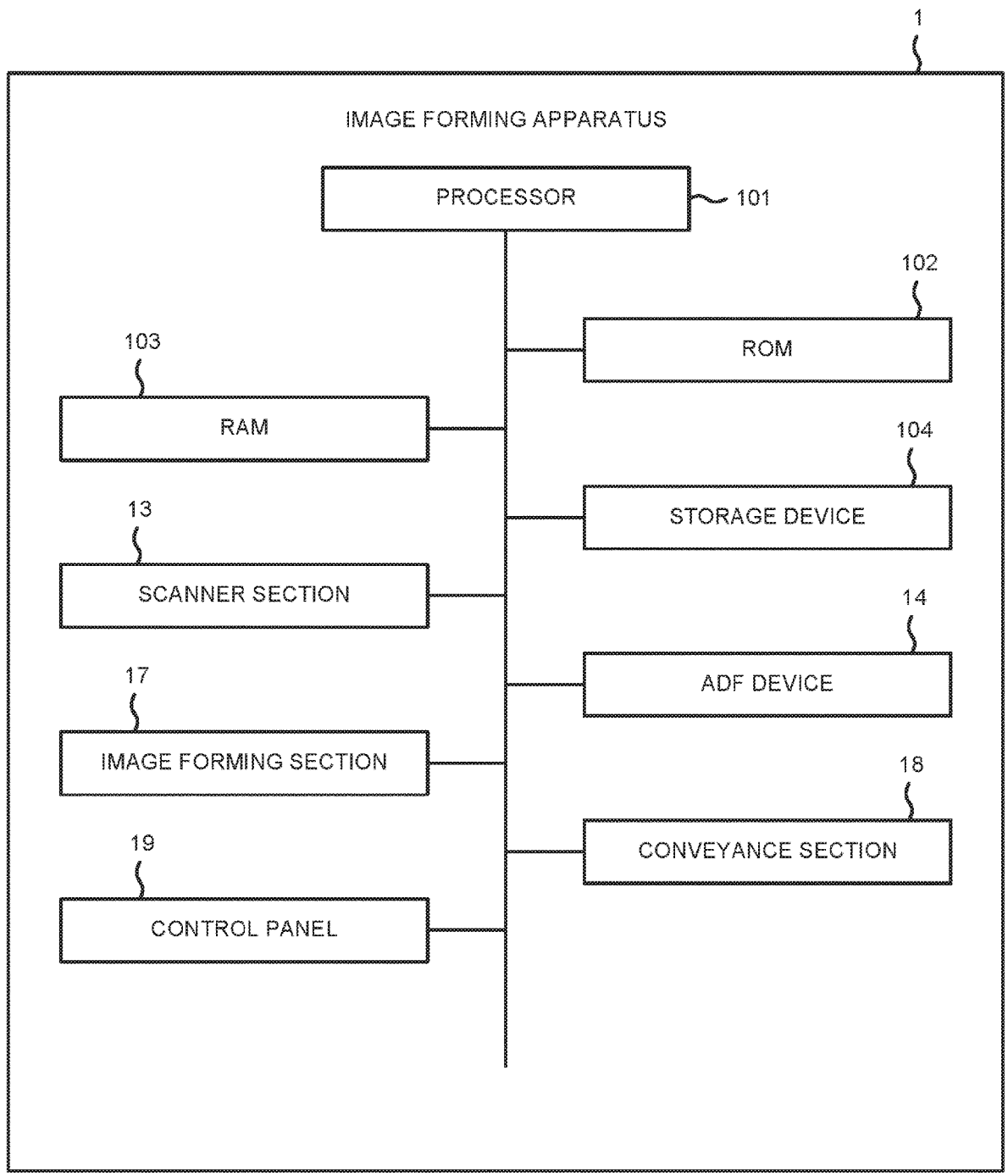
FIG. 3 is a block diagram exemplifying a control system of the image forming apparatus according to at least one embodiment.

FIG. 3 is a block diagram exemplifying a control system of the image forming apparatus 1. In addition to the scanner section 13, the ADF device 14, the image forming section 17, the conveyance section 18 and the control panel 19 described above, the image forming apparatus 1 further includes the following components. The image forming apparatus 1 includes a processor 101, a ROM (Read Only Memory) 102, a RAM (Random Access Memory) 103, and a storage device 104.

The processor 101 is, for example, a CPU (Central Processing Unit). The processor 101 executes various processes by executing a program stored in the ROM 102 or the storage device 104. The processor 101 controls the operations of the scanner section 13, the ADF device 14, the image forming section 17 and the conveyance section 18. The processor 101 acquires information indicating the operation by the user from the control panel 19. The processor 101 executes a processing according to the operation by the user.

The ROM 102 stores programs executed by the processor 101, control data, and the like. The RAM 103 is a working memory.

The storage device 104 is a rewritable nonvolatile memory. The storage device 104 is, for example, an SSD (Solid State Drive), an HDD (Hard Disk Drive), or the like. The storage device 104 stores programs executed by the processor 101, control data, and the like. Further, the storage device 104 stores data collected in various processing by the processor 101.

Next, the movement operations of the document tray 141 in the ADF device 14 are described.

Figure 4:
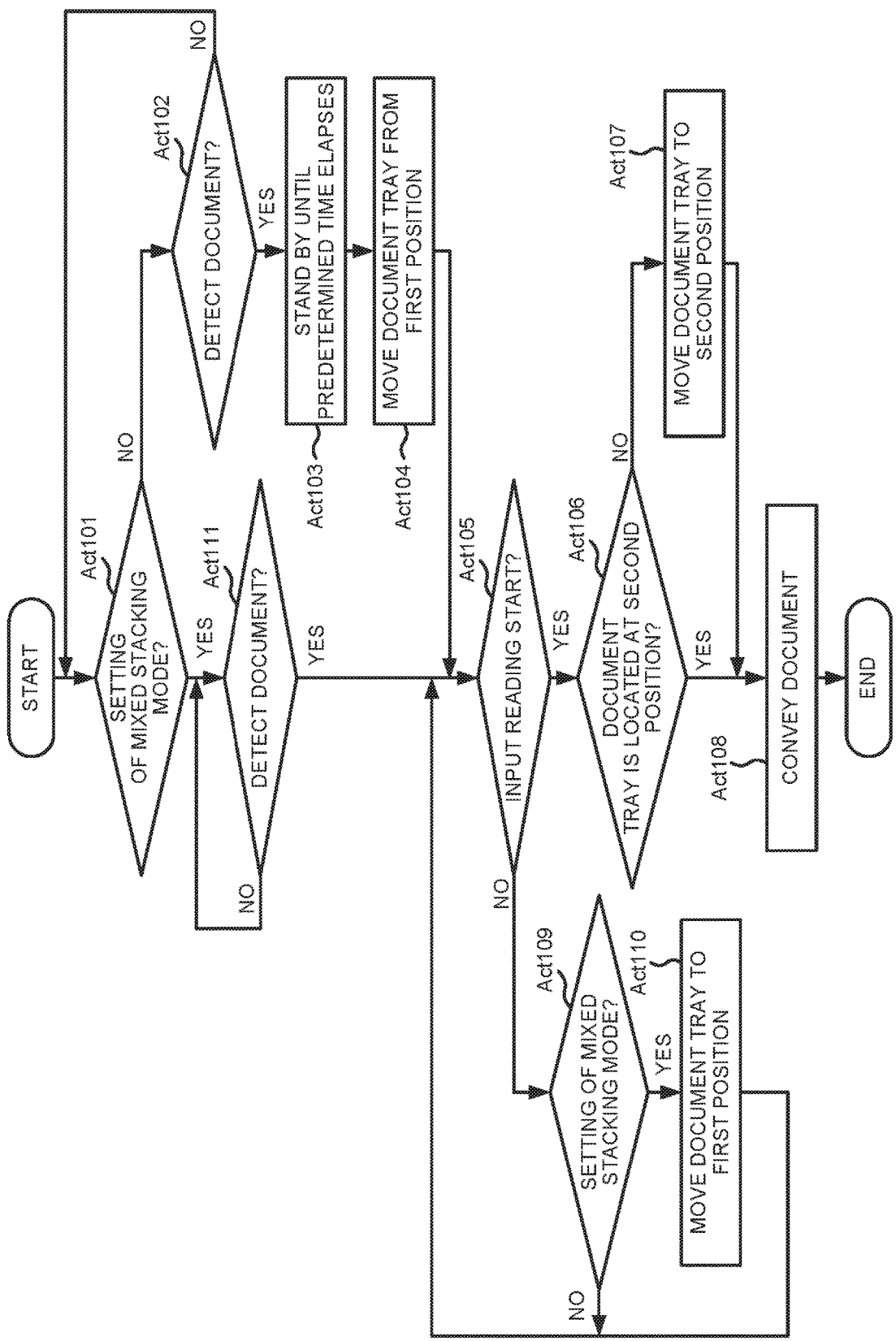
FIG. 4 is a flowchart exemplifying movement operations of a document tray according to at least one embodiment.

FIG. 4 is a flowchart exemplifying the movement operations of the document tray 141. Here, it is assumed that no document is placed on the document tray 141. Therefore, the document tray 141 is located at the first position.

The processor 101 determines whether or not the mixed stacking mode is set (Act 101). In Act 101, the processor 101 determines that the mixed stacking mode is set based on the information indicating that the "mixed stacking mode" button is pressed from the control panel 19. If the mixed stacking mode is not set (No in Act 101), the processor 101 determines whether or not the document is detected by the sensor 142 (Act 102). In Act 102, the processor 101 determines that the document is detected by the sensor 142 based on the information indicating the detection of the document from the sensor 142. As a result, the processor 101 determines that the document is placed on the document tray 141.

If the document is not detected by the sensor 142 (No in Act 102), the processor 101 proceeds to the processing in Act 101 described above.

If the document is detected by the sensor 142 (Yes in Act 102), the processor 101 stands by until a predetermined time elapses (Act 103). In Act 103, the processor 101 stands by until the predetermined time elapses since the document is detected by the sensor 142. In other words, the document tray 141 is located at the first position. The predetermined time can be arbitrarily set.

After the predetermined time elapses, the processor 101 moves the document tray 141 from the first position to the second position (Act 104). In Act 104, the processor 101 moves the document tray 141 from the first position to the second position according to the operation of the movement mechanism 146 by operating the movement mechanism 146.

The processor 101 determines whether or not the document reading start is input (Act 105). In Act 105, the processor 101 determines that the document reading start is input based on the information indicating that the "document reading start" button is pressed from the control panel 19. If the document reading start is input (Yes in Act 105), the processor 101 determines whether or not the document tray 141 is located at the second position (Act 106). If the document tray 141 is located at the second position (Yes in Act 106), the processor 101 enables the document feed roller 143 to convey the document placed on the document tray 141 (Act 108). As a result, the processor 101 can perform control to pick up the documents placed on the document tray 141 one by one to the ADF device 14.

If the document tray 141 is not located at the second position (No in Act 106), the processor 101 moves the document tray 141 to the second position (Act 107). In Act 107, the processor 101 moves the document tray 141 to the second position according to the operation of the movement mechanism 146 by operating the movement mechanism 146. After completing the movement of the document tray 141 to the second position, the processor 101 enables the document feed roller 143 to convey the document placed on the document tray 141 (Act 108). As a result, the processor 101 can perform control to pick up the documents placed on the document tray 141 one by one to the ADF device 14.

Returning to Act 105, if the reading start is not input (No in Act 105), the processor 101 determines whether or not the mixed stacking mode is set (Act 109). In Act 109, the processor 101 carries out the processing in the same way as Act 101. If the mixed stacking mode is not set (No in Act 109), the processor 101 proceeds to the processing in Act 105 described above.

If the mixed stacking mode is set (Yes in Act 109), the processor 101 moves the document tray 141 to the first position (Act 110). In Act 110, the processor 101 operates the movement mechanism 146 to move the document tray 141 to the first position according to the operation of the movement mechanism 146. If the document tray 141 is located at the second position by the processing in Act 104, the processor 101 moves the document tray 141 from the second position to the first position. On the other hand, if the document tray 141 is moving from the first position to the second position by the processing in Act 104, the processor 101 carries out the processing as follows. The processor 101 stops moving the document tray 141 from the first position to the second position, and moves the document tray 141 to the first position.

The processor 101 moves the document tray 141 to the first position in Act 110 and then proceeds to the processing in Act 105 described above. The processor 101 keeps the document tray at the first position until the document reading start is input after the document tray 141 is moved to the first position based on the setting of the mixed stacking mode.

Returning to Act 101, if the mixed stacking mode is set (Yes in Act 101), the processor 101 determines whether or not the document is detected by the sensor 142 (Act 111). The processor 101 carries out the processing in the same way as in Act 102.

Referring to the processing by the processor 101 described above, the movement mechanism 146 moves the document tray 141 as follows.

First, a case in which the user places at least one document on the document tray 141 and then sets the mixed stacking mode is described. The processing from Act 102 to Act 104 is referred to. The movement mechanism 146 moves the document tray from the first position to the second position based on the detection that the document is placed on the document tray 141. The processing in Act 104, Act 105, Act 109, and Act 110 is referred to in order. The movement mechanism 146 moves the document tray 141 to the first position based on the setting of the mixed stacking mode after moving the document tray 141 from the first position to the second position. The processing in Act 110 and Act 105 is referred to in order. The movement mechanism 146 keeps the document tray at the first position until the document reading start is input after moving the document tray 141 to the first position based on the setting of the mixed stacking mode. The processing in Act 105, 106, and 107 is referred to in order. The movement mechanism 146 moves the document tray 141 from the first position to the second position based on the input of the document reading start. The processing in Act 107 and 108 is referred to in order. The movement mechanism 146 conveys the document placed on the document tray 141 with the document feed roller 143 after the movement of the document tray 141 from the first position to the second position is completed.

Next, a case in which the mixed stacking mode is set before the user places the document on the document tray 141 is described. The processing in Act 101, 111, and 105 is referred to in order. The movement mechanism 146 keeps the document tray 141 at the first position until the document reading start is input after the mixed stacking mode is set. The processing in Act 105, 106, and 107 is referred to in order. The movement mechanism 146 moves the document tray 141 from the first position to the second position based on the input of the document reading start.

According to at least one embodiment, the document tray 141 is moved to the first position based on the setting of the mixed stacking mode even after moved from the first position to the second position. This widens the space for placing the document on the document tray 141. Therefore, even if the user places the documents with different sizes on the document tray 141, the documents with different sizes can be correctly placed on the document tray 141. The placement property of the document is improved. Here, the placement property of the document refers to reducing unintended skew of the document without making the user panic and without necessitating corrective action or additional manipulation by the user.

Further, the document tray 141 is maintained at the first position until the document reading start is input after moved to the first position based on the setting of the mixed stacking mode. In this manner, the user can place the documents with different sizes correctly on the document tray 141 without panic and without necessitating corrective action or additional manipulation by the user.

Furthermore, the document tray 141 is maintained at the first position if the user sets the mixed stacking mode no matter when the user places the document on the document tray 141. As a result, waiting time (1st copy time) of a user at the time of placing the documents with the same size on the document tray 141 is reduced. In addition, placement property at the time of placing the documents with different sizes on the document tray 141 is improved.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus, comprising:
   a tray configured to accommodate a document;
   a conveyor configured to convey the document placed on the tray;
   a detector configured to detect that the document is placed on the tray;
   a mover configured to move the tray from a first position to a second position closer to the conveyor than the first position based on a detection that the document is placed on the tray; and
   a processor configured to control the mover to maintain the tray at the first position upon determining a selection of a mixed stacking mode in which mixing of documents with different sizes on the tray is permitted.

2. The image forming apparatus according to claim 1, wherein
   the mover is configured to maintain the tray at the first position until the processor receives an input to begin document reading.

3. The image forming apparatus of claim 1, wherein the processor is configured to, after determining that the mixed stacking mode is selected, determine whether the detector has detected a presence of the document.

4. The image forming apparatus of claim 1, wherein the processor is configured to control the mover to widen an available space to accommodate the document after the document tray has been moved from the first position to the second position.

5. The image forming apparatus of claim 1, wherein the processor is configured to cause the mover to maintain the document tray at the first position after a user selects the mixed stacking mode, regardless of when the user places the document on the document tray.

6. The image forming apparatus of claim 1, wherein
   in the mixed stacking mode, a first document having a first size and a second document having a second size are oriented such that a shorter side of each of the first and second documents is aligned along a first direction of the document tray, or a longer side of the first document and a shorter side of the second document are aligned along the first direction of the document tray.

7. A document reading device, comprising:
   a tray configured to accommodate a document;
   a conveyor configured to convey the document placed on the tray;
   a detector configured to detect that the document is placed on the tray;
   a mover configured to move the tray from a first position to a second position based on a detection that the document is placed on the tray, and
   a processor configured to control the mover to maintain the tray at the first position upon determining a selection of a mixed stacking mode in which mixing of documents with different sizes on the tray is permitted.

8. The document reading device according to claim 7, wherein
   the mover is configured to maintain the tray at the first position until document reading is started, the first position being farther from the conveyor than the second position.

9. The document reading device according to claim 7, wherein the processor is configured to, after determining that the mixed stacking mode is selected, determine whether the detector has detected a presence of the document.

10. The document reading device according to claim 7, wherein the processor is configured to control the mover to widen an available space to accommodate the document after the document tray has been moved from the first position to the second position.

11. The document reading device according to claim 7, wherein the processor is configured to cause the mover to maintain the document tray at the first position after a user selects the mixed stacking mode, regardless of when the user places the document on the document tray.

12. The document reading device according to claim 7, wherein
    in the mixed stacking mode, a first document having a first size and a second document having a second size are oriented such that a shorter side of each of the first and second documents is aligned along a first direction of the document tray, or a longer side of the first document and a shorter side of the second document are aligned along the first direction of the document tray.

13. A conveyance method, including:
    moving a tray from a first position to a second position closer to a conveyor than the first position based on detection that a document is placed on the tray;
    after moving the tray from the first position to the second position, moving the tray to the first position based on a selection of a mixed stacking mode in which mixing documents with different sizes on the tray is permitted;
    moving the tray from the first position to the second position based on an input to start document reading; and
    maintaining the tray at the first position upon determining a selection of a mixed stacking mode in which mixing of documents with different sizes on the tray is permitted.

14. The method according to claim 13, further comprising:
    maintaining the tray at the first position until receiving the input to start the document reading.

15. The method according to claim 13, further comprising:
    after determining that the mixed stacking mode is selected, determining whether a detector has detected a presence of the document.

16. The method according to claim 13, further comprising:
    widening an available space to accommodate the document after a previous movement of the document tray from the first position to the second position.

17. The method according to claim 13, further comprising:
    maintaining the document tray at the first position after a user selects the mixed stacking mode, regardless of when the user places the document on the document tray.

18. The method according to claim 13, wherein
in the mixed stacking mode, a first document having a first size and a second document having a second size are oriented such that a shorter side of each of the first and second documents is aligned along a first direction of the document tray, or a longer side of the first document and a shorter side of the second document are aligned along the first direction of the document tray.

19. The method according to claim 18, wherein the first direction is orthogonal to a conveyance direction of the documents.

20. The method according to claim 18, wherein the second direction is orthogonal to the first direction.

\* \* \* \* \*